(12) United States Patent
Chu et al.

(10) Patent No.: US 10,704,598 B1
(45) Date of Patent: Jul. 7, 2020

(54) HYDROSTATIC LINEAR GUIDEWAY

(71) Applicant: HIWIN TECHNOLOGIES CORP., Taichung (TW)

(72) Inventors: Yung-Chin Chu, Taichung (TW); Jian-Ting Lin, Taichung (TW)

(73) Assignee: HIWIN TECHNOLOGIES CORP., Taichung (TW)

( * ) Notice: Subject to any disclaimer, the term of this patent is extended or adjusted under 35 U.S.C. 154(b) by 0 days.

(21) Appl. No.: 16/293,157

(22) Filed: Mar. 5, 2019

(51) Int. Cl.
| | |
|---|---|
| *F16C 29/02* | (2006.01) |
| *F16C 32/06* | (2006.01) |
| *F16C 35/02* | (2006.01) |
| *B23Q 1/38* | (2006.01) |
| *B23Q 1/42* | (2006.01) |

(52) U.S. Cl.
CPC ............. *F16C 29/025* (2013.01); *B23Q 1/38* (2013.01); *B23Q 1/42* (2013.01); *F16C 32/0696* (2013.01); *F16C 35/02* (2013.01); *F16C 32/06* (2013.01); *F16C 2322/39* (2013.01)

(58) Field of Classification Search
CPC ...... F16C 29/02; F16C 32/06; F16C 32/0696; F16C 2322/38; F16C 35/02; F16C 43/02; F16C 2322/39; B23Q 1/38; B23Q 1/42
USPC ............................... 384/7, 12–13, 26, 29, 44
See application file for complete search history.

(56) References Cited

U.S. PATENT DOCUMENTS

| | | | | |
|---|---|---|---|---|
| 3,355,990 A | * | 12/1967 | Thum | F16C 29/025 409/219 |
| 3,583,774 A | * | 6/1971 | De Gast | B23Q 1/38 384/12 |
| 4,636,095 A | * | 1/1987 | Gerling | F16C 17/03 384/114 |
| 4,978,223 A | | 12/1990 | Stötzel et al. | |
| 5,488,771 A | * | 2/1996 | Devitt | B23Q 1/26 29/460 |
| 6,012,845 A | | 1/2000 | Lyon | |
| 6,123,457 A | * | 9/2000 | Suzuki | F16C 29/0609 184/5 |
| 6,149,306 A | * | 11/2000 | Zosi | F16C 29/025 384/107 |
| 7,556,430 B2 | * | 7/2009 | Wu | F16C 29/0609 184/5 |

(Continued)

FOREIGN PATENT DOCUMENTS

| | | | | |
|---|---|---|---|---|
| JP | 03239808 A | * | 10/1991 | ............ F16C 29/02 |
| JP | 4047889 B2 | * | 2/2008 | ............ F16C 29/025 |
| WO | 99/53207 A1 | | 10/1999 | |

*Primary Examiner* — Marcus Charles (74) *Attorney, Agent, or Firm* — Muncy, Geissler, Olds & Lowe, P.C.

(57) ABSTRACT

A hydrostatic linear guideway includes a rail, a slider coupled to the rail, and two load blocks disposed between the rail and the slider. A load portion of each load block is spaced from the groove wall of an outer groove of the rail and has an oil chamber facing toward the groove wall of one respective outer groove of the rail, such that an oil film is formed between the rail and each load block. A bearing portion of each load block is abutted against the groove wall of an inner groove of the slider so that the two load blocks are moved synchronously with the slider. Thus, the hydrostatic linear guideway of the present invention has the oil chamber defined in each load block and does not require additional processing of the slider, achieving the purpose of reducing the difficulty of the manufacturing process.

10 Claims, 8 Drawing Sheets

(56) References Cited

U.S. PATENT DOCUMENTS

| | | | | |
|---|---|---|---|---|
| 7,798,716 B2* | 9/2010 | Haub | ............... | F16C 29/0609 |
| | | | | 384/13 |
| 7,832,930 B2* | 11/2010 | Geka | ............... | F16C 29/0607 |
| | | | | 384/15 |
| 8,123,408 B2* | 2/2012 | Nishiwaki | ......... | F16C 29/0607 |
| | | | | 384/44 |
| 8,858,082 B2* | 10/2014 | Hsu | ............. | F16C 29/0642 |
| | | | | 384/43 |
| 8,967,862 B2* | 3/2015 | Hsu | ............. | F16C 29/065 |
| | | | | 384/45 |
| 9,222,515 B2* | 12/2015 | Chang | ............. | F16C 33/6659 |
| 9,488,223 B2* | 11/2016 | Roesch | ............ | F16C 33/66 |
| 9,574,605 B2* | 2/2017 | Ikegami | ........... | F16C 29/0607 |
| 10,378,581 B2* | 8/2019 | Nagao | ............. | F16C 29/0607 |
| 2004/0042689 A1* | 3/2004 | Wasson | ............ | F16C 29/008 |
| | | | | 384/12 |
| 2009/0060400 A1* | 3/2009 | Kuwabara | ......... | F16C 29/065 |
| | | | | 384/13 |
| 2009/0297075 A1* | 12/2009 | Muneishi | .......... | F16C 29/025 |
| | | | | 384/12 |
| 2009/0304312 A1* | 12/2009 | Horie | ............. | B25J 19/0062 |
| | | | | 384/13 |
| 2015/0023617 A1* | 1/2015 | Chien | ............. | F16C 32/0618 |
| | | | | 384/12 |

* cited by examiner

HYDROSTATIC LINEAR GUIDEWAY

BACKGROUND OF THE INVENTION

1. Field of the Invention

The present invention relates to linear guideway technology and more particularly, to a hydrostatic linear guideway.

2. Description of the Related Art

The so-called hydrostatic linear guideway mainly uses a certain pressure to fill the lubricating oil between the rail and the slider. By an oil film formed by the lubricating oil, the slider is smoothly moved along the rail in a frictionless state.

U.S. Pat. No. 4,978,233 discloses a hydrostatic bearing assembly highly adaptable to different types of applications, with the actual guiding and bearing functions being associated with guiding rails and separate carrying elements comprising separate bearing elements, the separately produced bearing elements having pressure pockets pressurized by a pressure agent, so as to permit a reduction in production costs and a better adaptation to required conditions of play so as to achieve a higher load bearing capacity. According to this prior art patent, the slider needs to be additionally processed to match the bearing elements. The configuration may cause the slider to be very difficult to process.

SUMMARY OF THE INVENTION

The present invention has been accomplished under the circumstances in view. It is the main object of the present invention to provide a hydrostatic linear guideway, which is easy to process and greatly reduces the difficulty of the manufacturing process.

To achieve this and other objects of the present invention, a hydrostatic linear guideway comprises a rail, a slider and two load blocks. The rail comprises two opposing outer grooves located on an outer surface thereof. The slider comprises a sliding groove. The slider is coupled to the rail by the sliding groove so that the slider can be displaced along the rail. The sliding groove defines therein two opposite inner grooves corresponding to the outer grooves of the rail. The two load blocks are respectively mounted between the outer grooves of the rail and the inner grooves of the slider, each comprising a load portion and a bearing portion. The load portion of each load block is spaced from the groove wall of one respective outer groove of the rail by a predetermined gap, and the load portion of each load block comprises an oil chamber facing toward the groove wall of one respective outer groove of the rail, such that an oil film is formed between each load block and the rail. The bearing portion of each load block is abutted against the groove wall of one respective inner groove of the slider. Thus, the two load blocks can synchronize with the slider.

It can be seen from the above that the hydrostatic linear guideway of the invention has the oil chamber defined in each load block and does not require additional processing of the slider, achieving the purpose of reducing the difficulty of the manufacturing process.

Preferably, the groove wall of each outer groove of the rail comprises two first load surfaces, and the load portion of each load block comprises two second load surfaces. Each second load surface of the load portion of each load block faces toward one respective first load surface of one respective outer groove of the rail. Each second load surface of the load portion of each load block has one respective said oil chamber defined therein. This arrangement can produce better bearing effect.

Preferably, the groove wall of each inner groove of the slider comprises two first bearing surfaces, and the bearing portion of each load block comprises two second bearing surfaces respectively abutted against one respective first bearing surface of one respective inner groove of the slider. Further, the first and second bearing surfaces can be sloped surfaces or curved surfaces, as long as the two can be matched with each other.

Preferably, an oil filling end cap and an oil draining end cap are respectively and fixedly mounted with two opposite ends of the slider. The oil filling end cap comprises an oil filling hole and a first oil filling passage in communication with the oil filling hole. The oil draining end cap comprises an oil draining hole and a first oil draining passage in communication with the oil draining hole. Each load block further comprises a second oil filling passage, an oil hole in communication with the associating oil chamber, a second oil draining passage and an oil guide hole adjacent to the associating oil chamber. The second oil filling passage has one end thereof disposed in communication with the first oil filling passage, and an opposite end thereof disposed in communication with the oil hole. The second oil draining passage has one end thereof disposed in communication with the first oil draining passage, and an opposite end thereof disposed in communication with the oil guide hole. Thus, the lubricating oil can enter the first oil filling passage through the oil filling hole, and then flow along the first oil filling passage to each second oil filling passage, and then flow from each second oil filling passage to the oil chambers. The lubricating oil flowering over the oil chambers can flow through the oil guide hole to each second oil draining passage, and then flow from each second oil draining passage to the first oil draining passage for discharge to the outside via the oil draining hole.

Other advantages and features of the present invention will be fully understood by reference to the following specification in conjunction with the accompanying drawings, in which like reference signs denote like components of structure.

DETAILED DESCRIPTION OF THE INVENTION

The applicant first declares here, in the entire specification, including the preferred embodiment described below and the claims of the present invention, the directional terms are based on the direction in the drawings. In the following preferred embodiment, the same reference numerals are used to refer the same or similar elements or structural features thereof.

Figure 1:
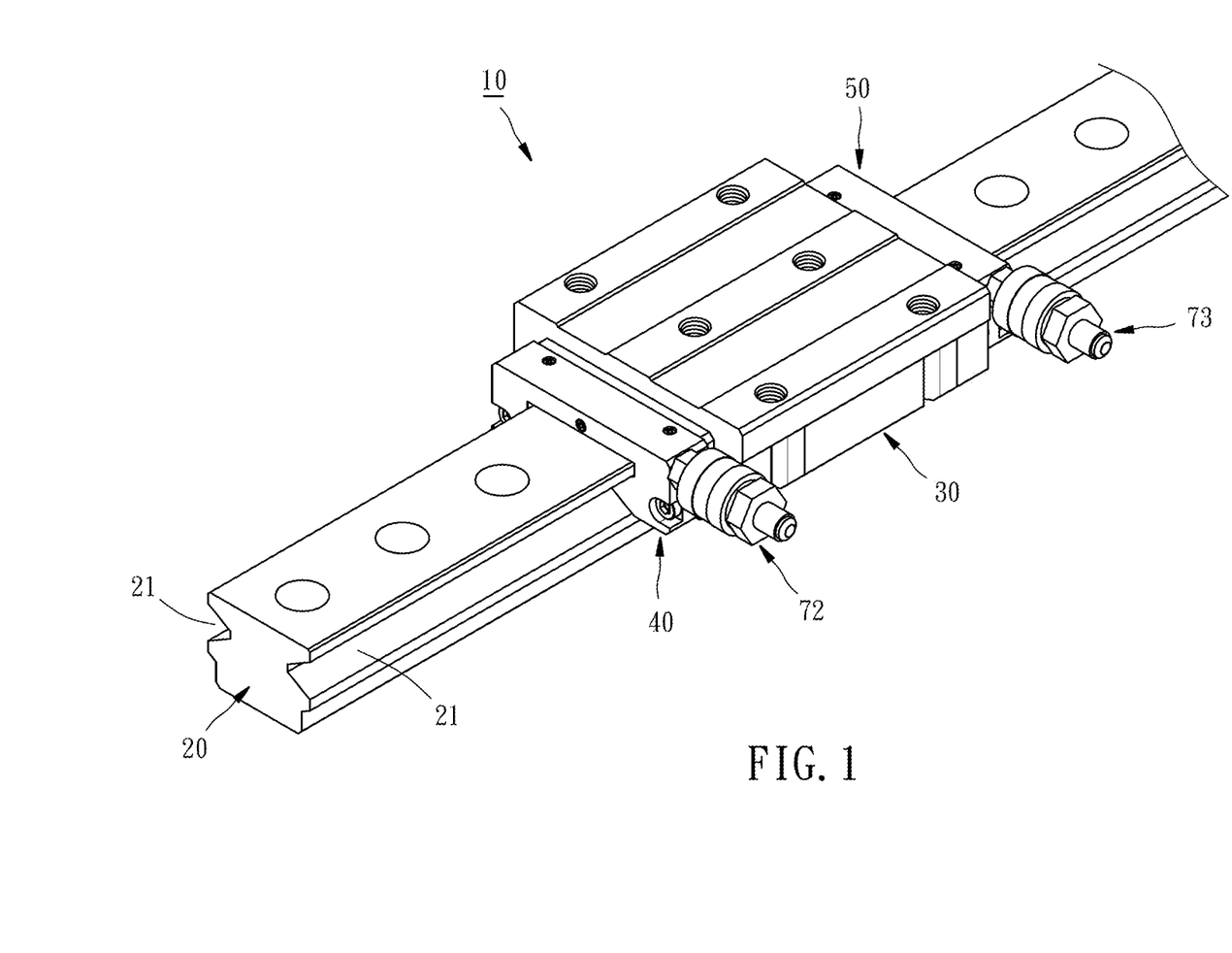
FIG. 1 is an oblique top elevational view illustrating a hydrostatic linear guideway in accordance with the present invention.
Figure 2:
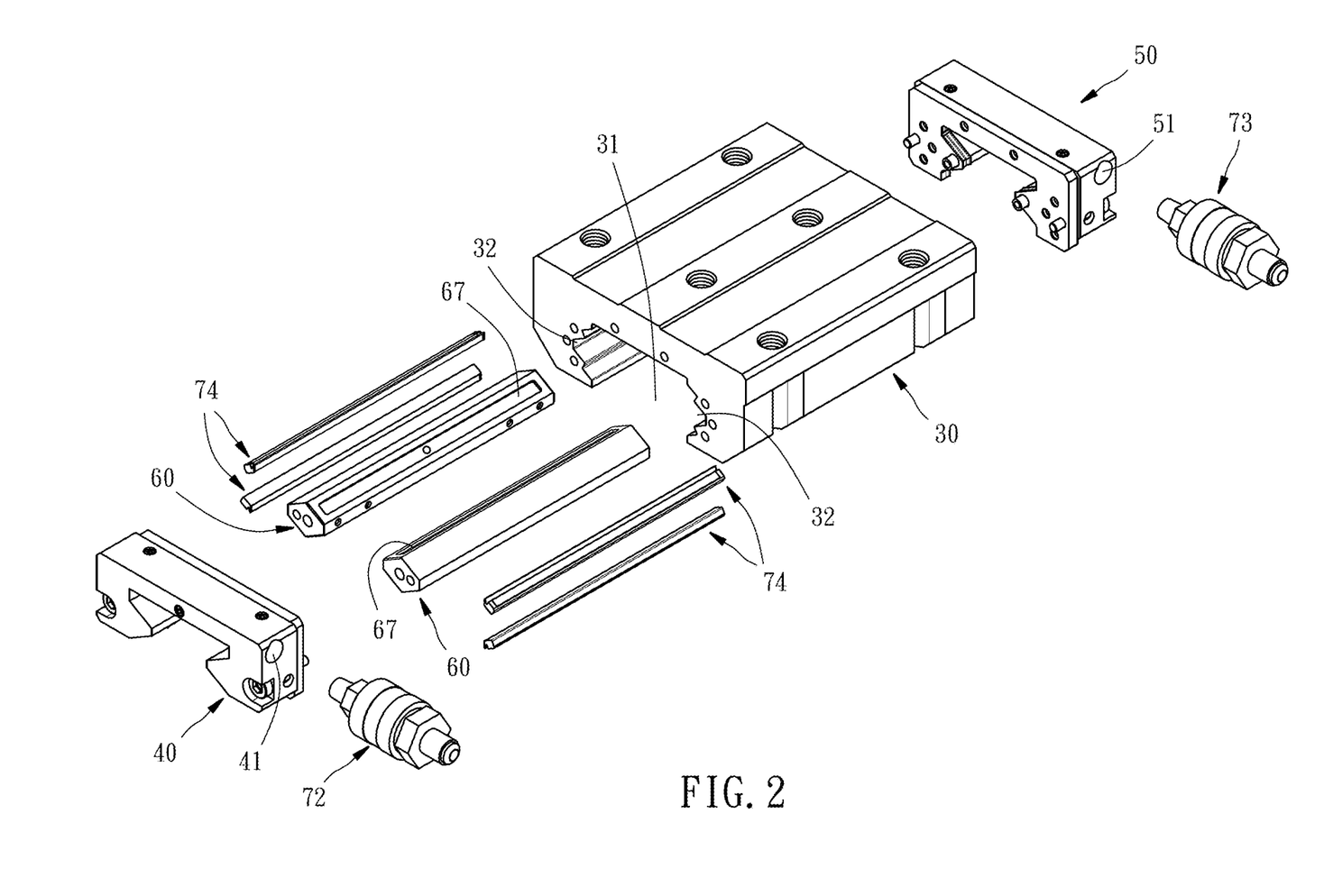
FIG. 2 is an exploded view of the hydrostatic linear guideway in accordance with the present invention.

Referring to FIGS. 1 and 2, a hydrostatic linear guideway 10 of the present invention comprises a rail 20, a slider 30 and two load blocks 60.

Figure 4:
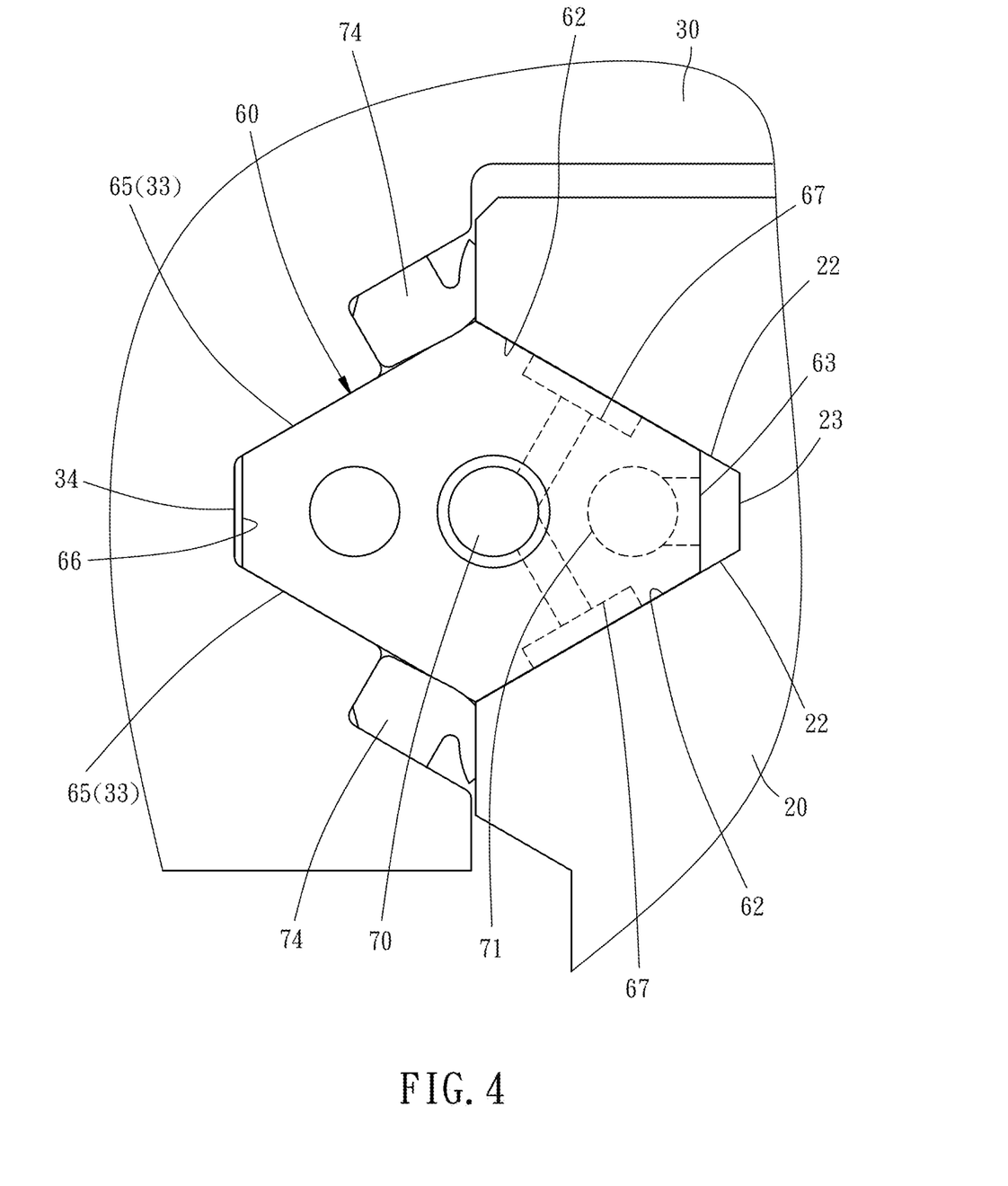
FIG. 4 is an end view of the present invention after removal of the oil filling end cap.

The rail 20 has two opposite outer grooves 21 located on the outer peripheral wall thereof and extending along the length thereof. As illustrated in FIG. 4, the groove wall of each outer groove 21 has two first load surfaces 22 and a first connecting surface 23 that connects the two first load surfaces 22. These two first load surfaces 22 are sloped surfaces mirror-symmetrical with respect to the first connecting surface 23.

The slider 30 has a sliding groove 31. The slider 30 is assembled on the rail 20 by the sliding groove 31 so that the slider 30 is movable along the rail 20. Further, as illustrated in FIG. 2 and FIG. 4, the groove wall of the sliding groove 31 has two opposite inner grooves 32. The inner grooves 32 of the slider 30 correspond to the outer grooves 21 of the rail 20 in a one-to-one manner. Further, the groove wall of each inner groove 32 of the slider 30 has two first bearing surfaces 33 and a second connecting surface 34 that connects the two first bearing surfaces 33. These two first bearing surfaces 33 are sloped surfaces mirror-symmetrical with respect to the second connecting surface 34.

Figure 6:
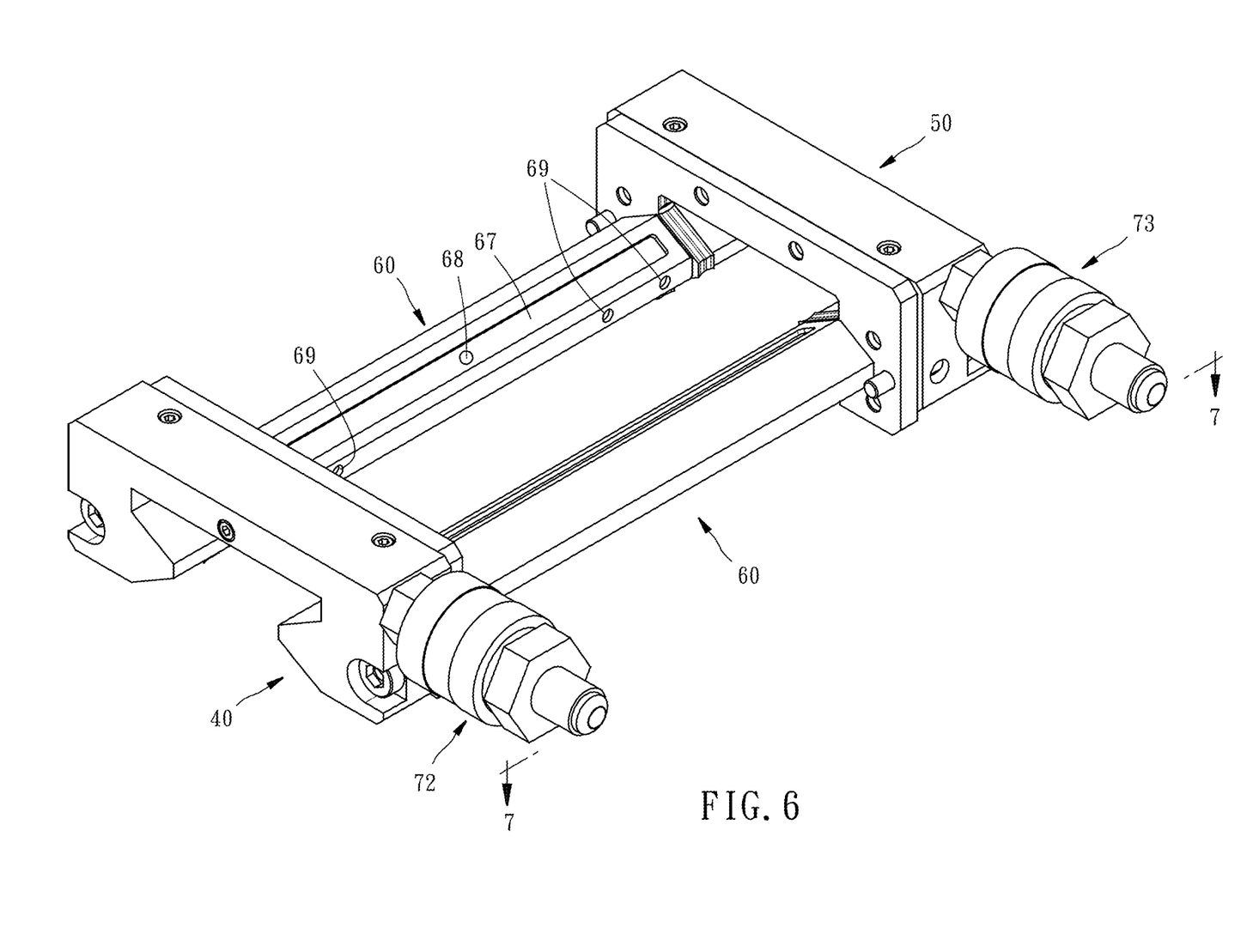
FIG. 6 is an elevational view of the present invention after removal of the rail and the slider from the hydrostatic linear guideway.
Figure 7:
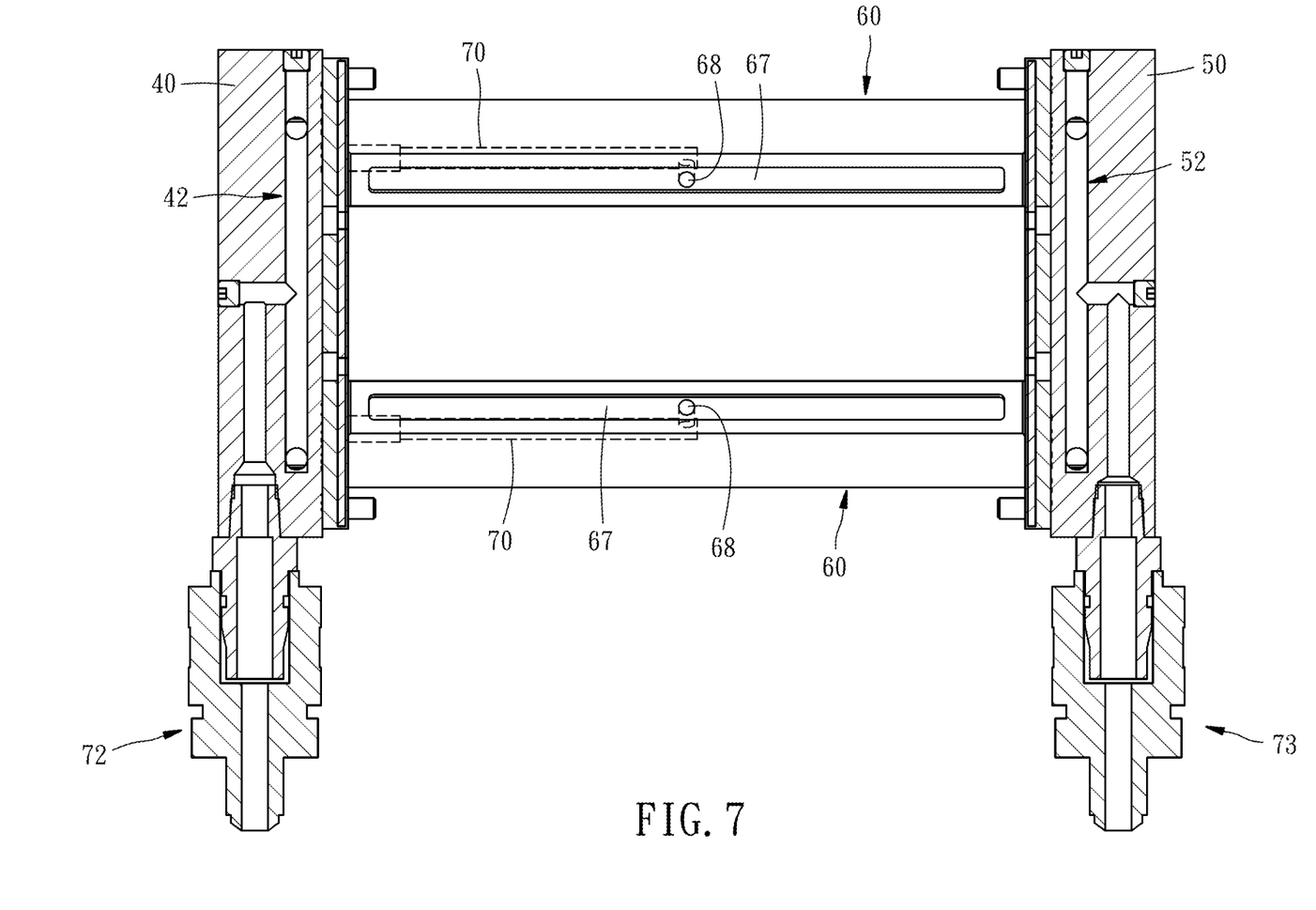
FIG. 7 is a cross-sectional view of a part of from the cross-sectional line 7-7 in FIG. 6, showing the oil path relationship between the oil filling end cap and the load blocks.

Further, as illustrated in FIGS. 2, 6 and 7, an oil filling end cap 40 and an oil draining end cap 50 are respectively affixed to two opposite ends of the slider 30 by fasteners, such as screws. The oil filling end cap 40 has an oil filling hole 41 and a first oil filling passage 42 in communication with the oil filling hole 41. The oil draining end cap 50 has an oil draining hole 51 and a first oil draining passage 52 in communication with the oil draining hole 51.

Figure 3:
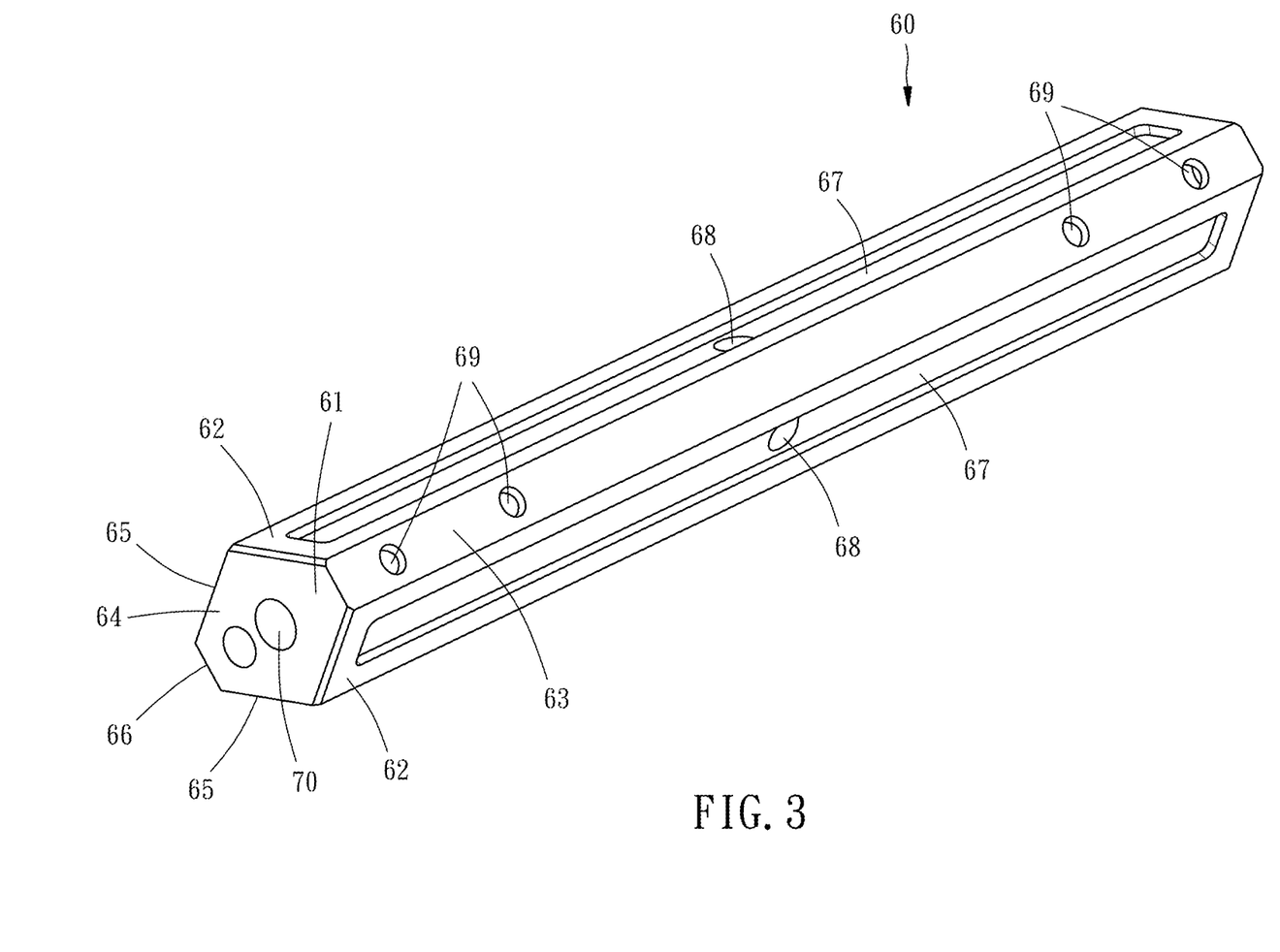
FIG. 3 is an oblique top elevational view of the load block of the hydrostatic linear guideway in accordance with the present invention.

The load blocks 60 are each presented in the form of a columnar body. As illustrated in FIG. 3, each load block 60 has a load portion 61 and a bearing portion 64. The load portion 61 of each load block 60 has two second load surfaces 62 and a third connecting surface 63 that connects the two second load surfaces 62. These two second load surfaces 62 are sloped surfaces mirror-symmetrical with respect to the third connecting surface 63. The bearing portion 64 of each load block 60 has two second bearing surfaces 65 and a fourth connecting surface 66 that connects the two second bearing surfaces 65. The two second bearing surfaces 65 are sloped surfaces and mirror-symmetrical with respect to the fourth connecting surface 66.

Figure 8:
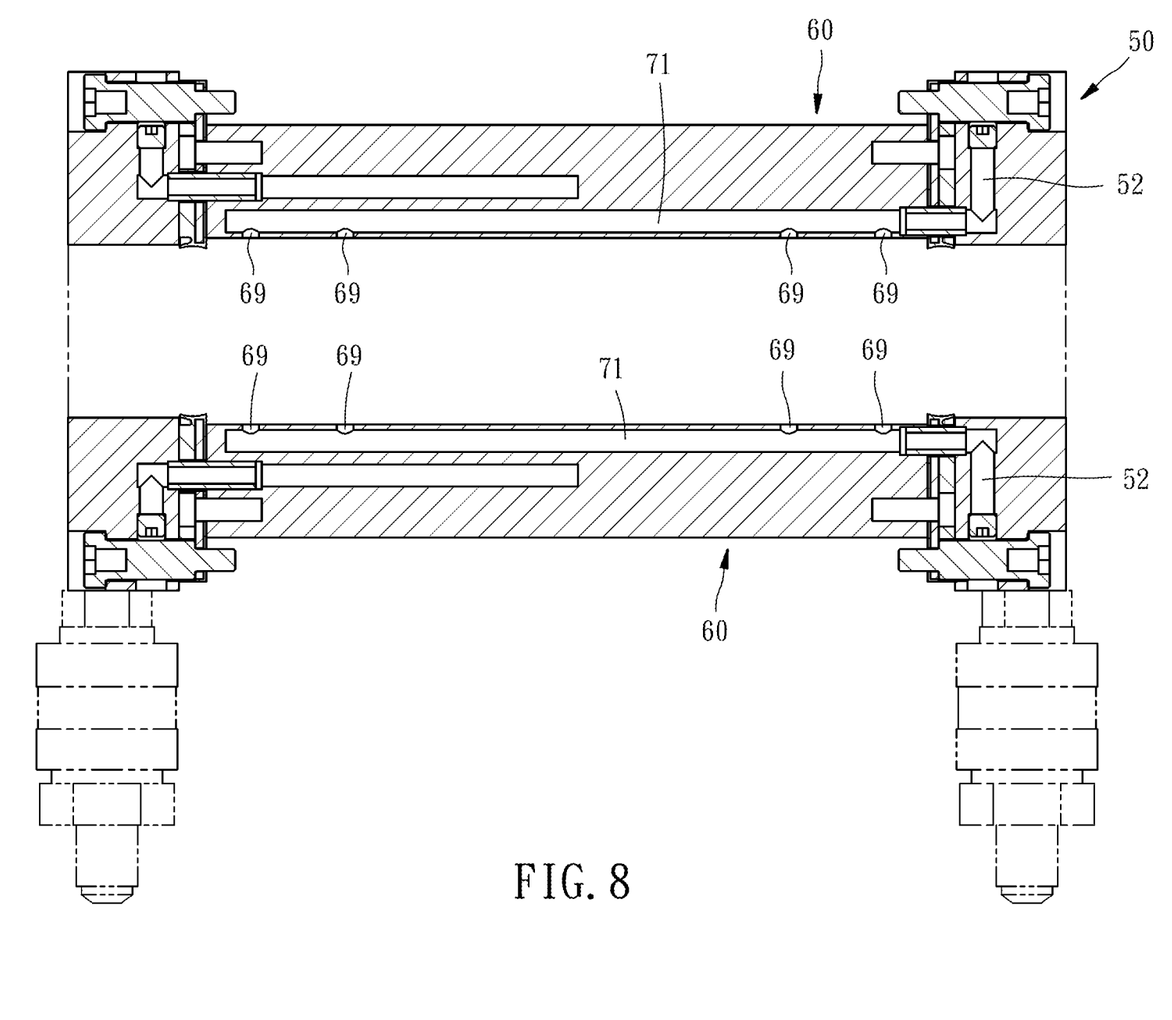
FIG. 8 is similar to FIG. 7, showing the oil path relationship between the oil draining end cap and the load blocks.

Further, each second load surface 62 of the load portion 61 of each load block 60 defines an oil chamber 67 and an oil hole 68 in communication with the oil chamber 67. Each of the two ends of the third connecting surface 63 of the load portion 61 of each load block 60 is provided with two oil guide holes 69 adjacent to the associating oil chamber 67. Further, as illustrated in FIGS. 3, 7 and 8, each load block 60 has a second oil filling passage 70 and a second oil draining passage 71 defined therein. The second oil filling passage 70 has one end thereof disposed in communication with the two oil holes 68. The second oil draining passage 71 is disposed in communication with the four oil guide holes 69.

Figure 5:
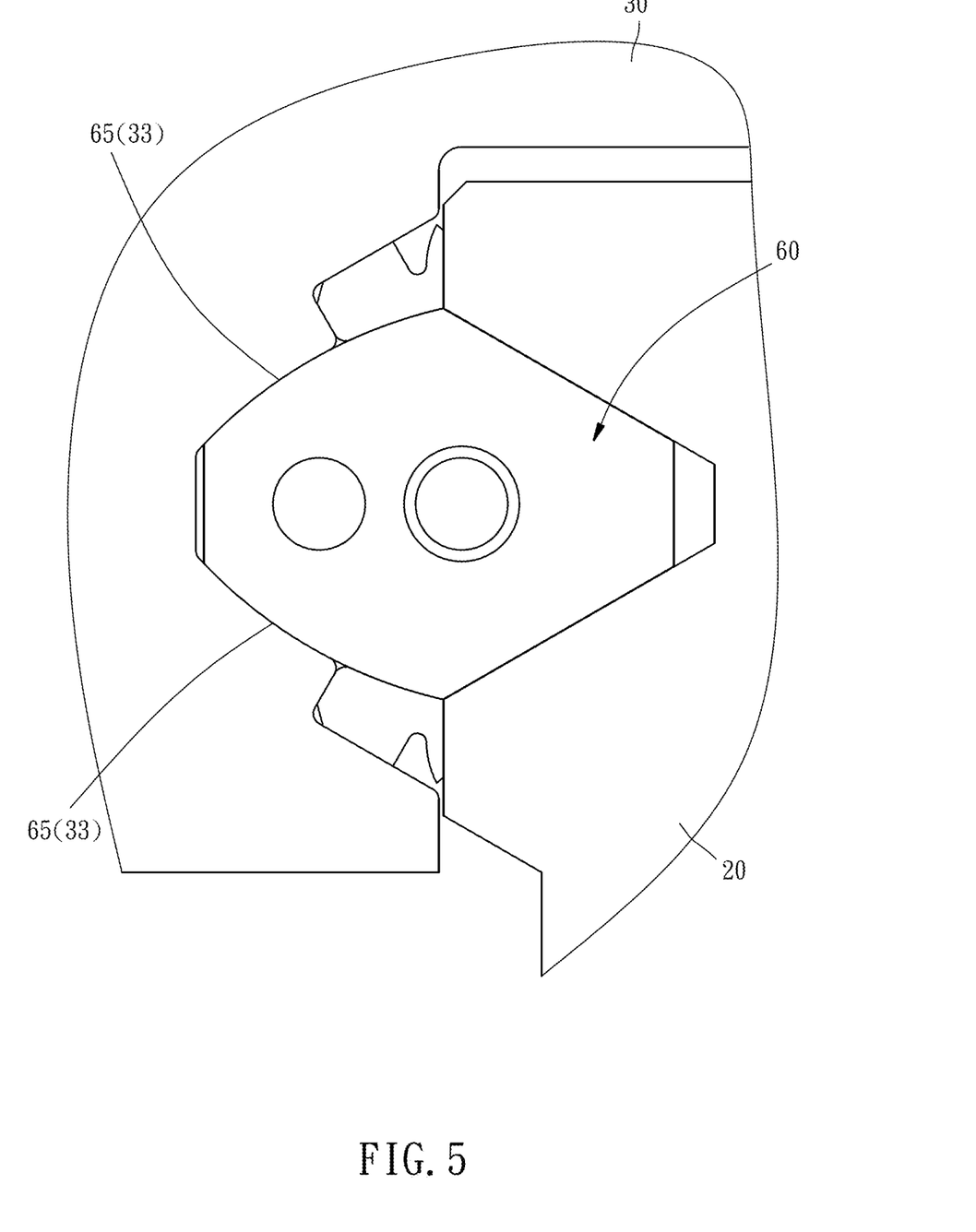
FIG. 5 is similar to FIG. 4, shown the first and second bearing surfaces in the form of a curved surface.

As illustrated in FIG. 4, the load blocks 60 are disposed between the outer grooves 21 of the rail 20 and the inner grooves 32 of the slider 30, more specifically, the second load surfaces 62 of the load blocks 60 do not contact the respective first load surfaces 22 of the rail 20 and the third connecting surfaces 63 of the load blocks 60 are aimed at the respective first connecting surfaces 23 of the rail 20 without contact, thus, a predetermined gap is kept between the load portion 61 of each load block 60 and the rail 20. Moreover, the oil chambers 67 of the load blocks 60 correspond to the first load surfaces 22 of the rail 20 in a one-to-one manner. The second bearing surface 65 of each load block 60 is abutted against one respective first bearing surface 33 of the slider 30. The fourth connecting surface 66 of each load block 60 is aimed at one respective second connecting surface 34 of the slider 30 without contact. Thus, the load blocks 60 are moved synchronously with the slider 30. However, it should be additionally noted that the first bearing surfaces 33 of the slider 30 and the second bearing surfaces 65 of the load blocks 60 are not limited to the use of sloped surfaces (as shown in FIG. 4) and may also be presented in the form of curved surfaces (as shown in FIG. 5), as long as the configuration between the two can work together. Further, if the first bearing surfaces 33 of the slider 30 and the second bearing surfaces 65 of the load blocks 60 are all sloped surfaces, the effect of increasing the structural rigidity and improving the positioning accuracy can be achieved. If the first bearing surfaces 33 of the slider 30 and the second bearing surfaces 65 of the load blocks 60 are all curved surfaces, it is capable of fine-tuning to achieve the absorption processing error.

Referring to FIGS. 6-8 again, the oil filling end cap 40 and the oil draining end cap 50 are respectively affixed to two opposite ends of each load block 60 by fasteners, such as screws, enabling the respective one ends of the second oil filling passages 70 of the two load blocks 60 to be respectively disposed in communication with the first oil filling passage 42 of the oil filling end cap 40. Thus, lubricating oil can enter the first oil filling passage 42 through an oil filling connector 72 connected with the oil filling hole 41 to flow along the first oil filling passage 42 into the second oil filling passage 70 of each load block 60, and then to flow through the oil holes 68 into the oil chambers 67, forming an oil film (not shown) between the second load surface 62 of the load block 60 and the first load surface 22 of the rail 20. Further, the second oil draining passages 71 of the two load blocks 60 have respective one ends thereof disposed in communication with the first oil draining passage 52 of the oil draining end cap 50 so that the lubricating oil overflowing the oil chambers 67 can flow from the oil guide holes 69 into the second oil draining passages 71, then flow along the second oil draining passages 71 to the first oil draining passage 52, and finally flow to the outside through an oil draining connector 73 connected with the oil draining hole 51.

On the other hand, in order to limit the flow direction of the lubricating oil after overflowing the oil chambers 67, as shown in FIGS. 2 and 4, at least one barrier member 74 (for example, a rubber strip) is added between each load block 60 and the slider 30. The number of the at least one barrier member 74 can be adjusted to mate with the oil chambers 67. In the present preferred embodiment, four barrier members 74 are used and arranged in pairs adjacent to the oil chambers 67. Further, the barrier members 74 and the oil guide holes 69 are disposed at two opposite sides relative to the oil chambers 67. Thus, the lubricating oil flowing over the oil chambers 67 is blocked by the barrier member 74 and flows toward the oil guide holes 69 to facilitate the draining operation. In addition, the barrier member 74 can also achieve dust-proof effect, avoiding dust entering the oil chambers 67.

As can be seen from the above, the hydrostatic linear guideway 10 of the present invention has the oil chamber 67, the second oil filling passage 70 and the second oil draining passage 71 defined in each load block 60 and does not require additional processing of the slider 30. This can achieve the purpose of reducing the difficulty of the manufacturing process.

What is claimed is:

1. A hydrostatic linear guideway, comprising:
    a rail comprising two opposing outer grooves located on an outer surface thereof;
    a slider comprising a sliding groove, said slider being coupled to said rail by said sliding groove so that said slider is movable along said rail, said sliding groove defining therein two opposite inner grooves corresponding to said outer grooves of said rail; and
    two load blocks respectively mounted between said outer grooves of said rail and said inner grooves of said slider, each said load block comprising a load portion and a bearing portion, said load portion of each said load block being spaced from a groove wall of one respective said outer groove of said rail by a predetermined gap, said load portion of each said load block comprising an oil chamber facing toward said groove wall of one respective said outer groove of said rail, said bearing portion of each said load block being abutted against a groove wall of one respective said inner groove of said slider.

2. The hydrostatic linear guideway as claimed in claim 1, wherein said groove wall of each said outer groove of said rail comprises two first load surfaces; said load portion of each said load block comprises two second load surfaces, each said second load surface of said load portion of each said load block facing toward one respective said first load surface of one respective said outer groove of said rail, each said second load surface of said load portion of each said load block comprising one said oil chamber.

3. The hydrostatic linear guideway as claimed in claim 2, wherein said groove wall of each said outer groove of said rail further comprises a first connecting surface connecting the associating said two first load surfaces; said load portion of each said load block further comprises a third connecting surface connecting the associating said two second load surfaces and facing toward said first connecting surface of one respective said outer groove of said rail.

4. The hydrostatic linear guideway as claimed in claim 3, wherein each said first load surface is a sloped surface, and the two said first load surfaces are mirror-symmetrical with respective to said first connecting surface; each said second load surface is a sloped surface, and the two said second load surfaces are mirror-symmetrical with respective to said third connecting surface.

5. The hydrostatic linear guideway as claimed in claim 1, wherein said groove wall of each said inner groove of said slider comprises two first bearing surfaces; said bearing portion of each said load block comprises two second bearing surfaces respectively abutted against one respective said first bearing surface of one respective said inner groove of said slider.

6. The hydrostatic linear guideway as claimed in claim 5, wherein said groove wall of each said inner groove of said slider further comprises a second connecting surface connecting the two said first bearing surfaces; said bearing portion of each said load block further comprises a fourth connecting surface connecting the said two second bearing surfaces and facing toward said second connecting surface of one respective said inner groove of said slider.

7. The hydrostatic linear guideway as claimed in claim 6, wherein each said first bearing surface is a sloped surface and the said two first bearing surfaces are mirror-symmetrical with respective to said second connecting surface; each said second bearing surface is a sloped surface and the two said second bearing surfaces are mirror symmetrical with respect to said fourth connecting surface.

8. The hydrostatic linear guideway as claimed in claim 6, wherein each said first bearing surface is a curved surface and the said two first bearing surfaces are mirror-symmetrical with respective to said second connecting surface; each said second bearing surface is a curved surface and the two said second bearing surfaces are mirror-symmetrical with respect to said fourth connecting surface.

9. The hydrostatic linear guideway as claimed in claim 1, wherein an oil filling end cap and an oil draining end cap are respectively and fixedly mounted to two opposite ends of said slider, said oil filling end cap comprising an oil filling hole and a first oil filling passage in communication with said oil filling hole, said oil draining end cap comprising an oil draining hole and a first oil draining passage in communication with said oil draining hole; each said load block comprises a second oil filling passage, an oil hole in communication with the associating said oil chamber, a second oil draining passage and an oil guide hole adjacent to the associating oil chamber, said second oil filling passage having one end thereof disposed in communication with said first oil filling passage and an opposite end thereof disposed in communication with said oil hole, said second oil draining passage having one end thereof disposed in communication with said first oil draining passage and an opposite end thereof disposed in communication with said oil guide hole.

10. The hydrostatic linear guideway as claimed in claim 9, further comprising a barrier member mounted between each said load block and said slider, and disposed adjacent to said oil chamber of one respective said load block and opposite to said oil guide hole with respective to said oil chamber of one respective said load block.

* * * * *